H. W. BARSON.
WEIGHING SCALE.
APPLICATION FILED JULY 7, 1919.
1,370,724.
Patented Mar. 8, 1921.
2 SHEETS—SHEET 1.
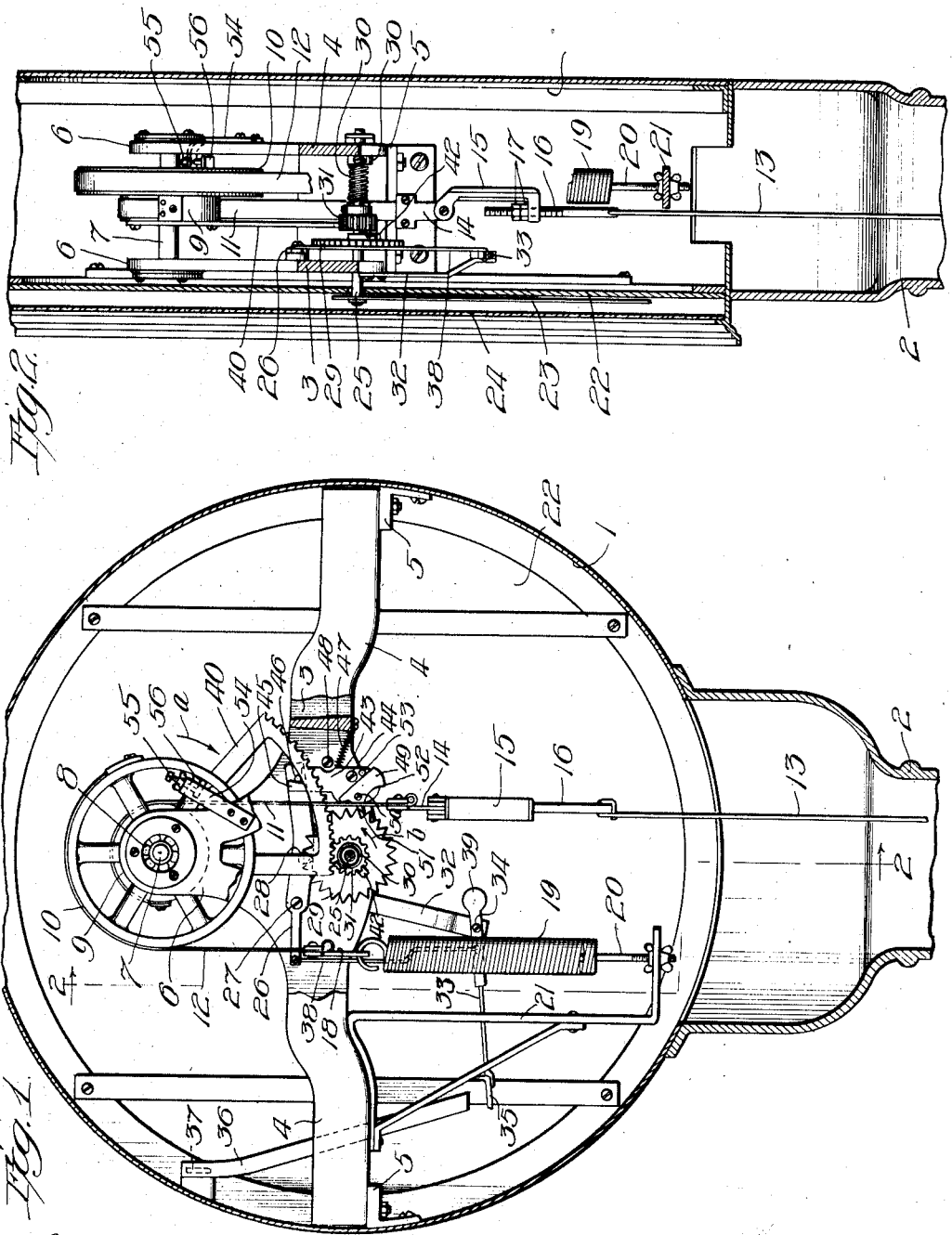
Witness:
Harry S. Gaither
Inventor:
Harry W. Barson
by Peirce, Fisher & Clapp
Attys

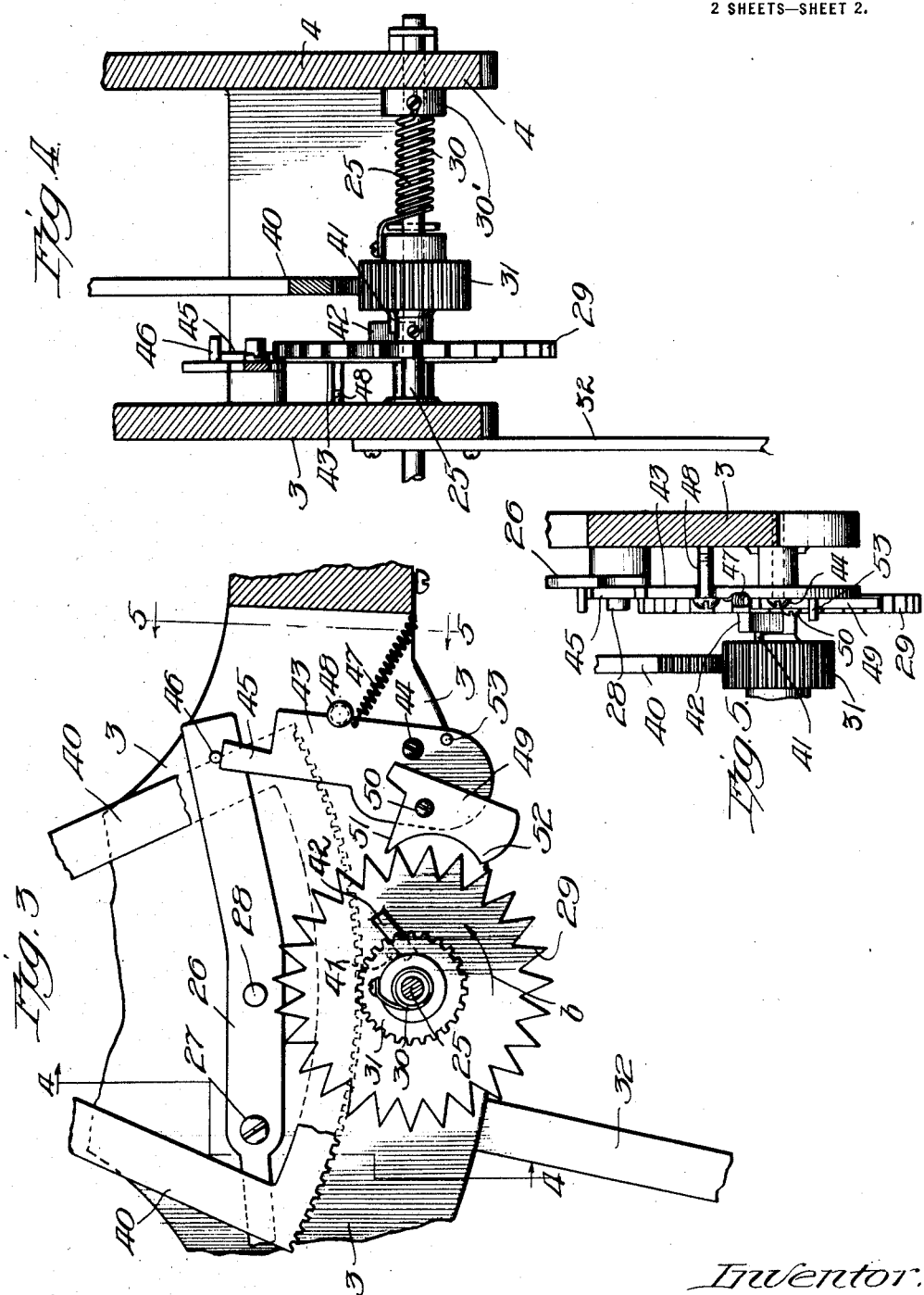

UNITED STATES PATENT OFFICE.

HARRY W. BARSON, OF CHICAGO, ILLINOIS, ASSIGNOR TO ODE D. JENNINGS, OF CHICAGO, ILLINOIS.

WEIGHING-SCALE.

1,370,724.  Specification of Letters Patent.  Patented Mar. 8, 1921.

Application filed July 7, 1919. Serial No. 309,046.

*To all whom it may concern:*

Be it known that I, HARRY W. BARSON, a citizen of the United States, and a resident of Chicago, county of Cook, and State of Illinois, have invented certain new and useful Improvements in Weighing-Scales, of which the following is a specification.

The invention relates to weighing scales, and more particularly to coin-controlled scales, and seeks to provide an improved weighing mechanism and improved means for controlling the weight indicator. The invention consists in the features of improvement hereinafter set forth, illustrated in the preferred form in the accompanying drawings and more particularly pointed out in the appended claims.

In the drawings, Figure 1 is a rear elevation of the upper portion of the weighing scale with the inclosing casing shown in section. Fig. 2 is a vertical section on the line 2—2 of Fig. 1. Fig. 3 is a detail view in rear elevation of parts of the indicator mechanism. Fig. 4 is a side elevation with parts shown in section on the line 4—4 of Fig. 3. Fig. 5 is a detail view in elevation with parts in section on the line 5—5 of Fig. 3.

The upper portion only of the machine casing is shown. It comprises a circular head 1 mounted upon the upper end of a column 2. The mechanism is mounted within the head upon a transverse cast metal frame comprising front and rear members 3 and 4 which are connected together and are mounted at their ends upon lugs 5 fixed to the cylindrical wall of the head 1. The transverse members 3 and 4 of the frame are provided with central upwardly projecting portions 6 within which is journaled a horizontal main shaft 7, the latter being preferably mounted at its ends in ball bearings 8. Two drums 9 and 10 are fixed upon the shaft 7 and are provided with concentric, cylindrical peripheral surfaces which are preferably of different diameters. Thin metal straps 11 and 12 are fixed, respectively, at their ends to the drums 9 and 10 and extend in opposite directions over the peripheries thereof. The strap 11 is connected to a weight-actuated rod 13 which extends downwardly through the column 2 and is connected at its lower end to the usual weighing levers and platforms (not shown). Preferably, the straps 11 and weight-actuated rod 13 are adjustably connected. For this purpose, the strap is fixed at its end to a clip 14 which is pivoted to the upper end of a coupling member 15. A bolt 16 is fixed to the upper end of the rod and extends through the lower end of the coupling member and is provided with nuts 17 which can be adjusted as desired. The strap 12 is connected at its ends by a clip 18 to the upper end of a spring 19. The latter is connected by an adjusting screw 20 to the lower end of a bracket 21 which is fixed to and depends from the frame member 4. The weight of a person or object on the platform of the scale exerts a pull upon the rod 13 and strap 11 and thereby, through the medium of the drum 9, rotates the shaft 7 and the drum 10 to wind up the strap 12 and extend the weighing spring 19, and the extent of this movement will be proportionate to the weight.

The head of the casing is provided as usual on its front side with an indicating dial 22 and an oscillating indicator or pointer 23, these parts being preferably arranged behind a glass plate 24. The indicator is fixed to the forward end of a shaft 25 which extends through a central opening in the dial and is journaled in the central portions of the transverse frame members 3 and 4, the indicator shaft being parallel to and below the main shaft 7 of the weighing mechanism. Suitable means adapted to be released or tripped by a coin is provided for holding the indicator in its normal or zero position and means is also provided for moving the indicator in forward direction when released. In the preferred form shown, a latch bar 26 is arranged above the indicator shaft and is mounted on a pivot screw 27 which is fixed to the front bar or member 3 of the supporting frame. A rearwardly projecting lug 28 on the latch bar is arranged to engage a toothed wheel 29 which is fixed to the indicator shaft. The teeth of the wheel are preferably pointed as shown and are provided on opposite sides with beveled or cam faces. A light spring 30 is coiled about the rear end of the indicator shaft 25 to turn the same in forward direction when the latch bar 26 is shifted to disengage its lug 28 from the toothed wheel 29. Preferably the spring 30 is connected at one end to a collar 30′ fixed to the shaft and at its opposite end to a pinion 31 loosely mounted on the shaft adjacent the hub of the toothed wheel 29.

A bar or supporting member 32 extends downwardly from the frame member 3 and a trip arm 33 is connected thereto by a pivot screw 34. The outer end of the trip arm carries a pan 35 which is arranged beneath the lower end of a coin chute 36. The latter is provided with a slot 37 which opens through the front of the casing and the trip arm 33 is connected by a link 38 to one end of the pivoted latch bar 26. The arrangement is such that, when a coin is inserted through the slot 37, it will be guided by the chute 36 onto the pan 35 to thereby depress the trip arm 33 and pull down one end of the latch bar and thus lift its opposite end and the lug 28 to release the wheel 29 and the indicator shaft whereon the latter is mounted. The extreme inner end of the trip arm is provided with a counterbalance 39 which tends to hold the latter and the latch bar connected thereto in normal position, but the weight of a coin in the pan 35 will shift the trip arm downwardly as described to trip or release the latch bar 26. This downward movement of the trip arm will so incline the pan or holder 35 that the coin will slide therefrom into the casing. Thereupon, the counterbalance 39 will return or tend to return the trip arm and latch bar to normal position.

The forward movement of the indicator shaft and the indicator pointer connected thereto is limited by a stop device which in turn is controlled by the weighing mechanism. In the preferred construction shown, a gear segment 40 is fixed to the shaft 7 or to the drum 9 thereon and meshes with the pinion 31 which, as stated, is loosely mounted on the indicator shaft 25. An eccentric stop pin 41 on the front side of the pinion is arranged to coöperate with a part connected to the indicator shaft to limit the forward movement of the indicator. In the form shown, the stop pin 41 is arranged to engage a lug 42 on the rear face of the toothed wheel 29.

A dog 43 is arranged to hold the latch bar 26 in its raised or released position. This dog is connected by a pivot screw 44 to the frame member 3 and is provided with a reduced upper end 45 which coöperates with a pin 46 projecting laterally from the end of the latch bar 26. A spring 47 extends between the frame and the dog and tends to move the latter into engagement with a fixed stop pin 48. Normally, the pin 46 of the latch bar engages the side of the reduced upper end 45 of the dog and holds the latter in the position shown in Fig. 1 with the spring 47 under tension. When the latch bar is tripped or raised, the spring draws the dog against the stop 48 so that its reduced upper end moves beneath the pin 46, as shown in Fig. 3, to thereby hold the latch bar in released position.

The dog 43 is extended below and on one side of its pivot 44 and carries a controlling pawl 49 which is connected thereto by a pivot screw 50, the pivot screw being located on one side of the pivot 44 and at the upper end of the pawl 49 so that the lower end of the latter acts as a weight to throw a pointed tooth 51 on its upper end into engagement with the teeth of the wheel 29. The pawl is also provided on its lower end or tail with a projection or blunt tooth 52 which is adapted to coöperate with the teeth of the wheel 29 to retard the forward movement of the indicator shaft and indicator. The dog 43 is also provided below its pivot with a projecting pin 53 which under certain conditions is arranged to be engaged by a pawl 49 to thereby shift the dog against the tension of its spring 47 and permit the reëngagement of the latch bar with the toothed locking wheel 29.

The normal position of the parts is shown in Fig. 1. When a weight is placed upon the platform of the scale it actuates, as described, the pull rod 13 to thereby rotate the shaft 7 and gear segment 40 in the direction indicated by the arrow $a$ in Fig. 1, this movement being effected against the pull of the spring 19 and the extent of movement being proportional to the weight. The gear segment, of course, rotates the loose pinion 31 on the indicator shaft in the direction indicated by the arrow $b$ in Figs. 1 and 3. During this movement, the indicator shaft will ordinarily be held stationary by the latch bar 26 and the stop pin 41 on the pinion will move away from its coöperating lug 42. At the same time, the spring 30 connected to the pinion and indicator shaft will be placed under tension. When a coin is deposited, the latch bar will be lifted or released as described and the dog 43 will be shifted by its spring 47 to hold the latch bar in released or disengaged position, as shown in Fig. 3. The spring 30 will then act to rotate the indicator shaft and indicator thereon in the direction indicated by the arrow $b$ until arrested by the engagement of the lug 42 with the stop pin 41. During this movement, the teeth of the wheel 29 will act on the under side of the tooth 51 of the pawl 49 and will oscillate it on its pivot 50. As the teeth of the wheel strike the upper tooth 51 of the pawl, they will throw the tooth 52 on its lower end into the path of the teeth to thereby slightly check or retard the forward movement of the wheel and indicator shaft. On account of this braking action of the pawl 49, the movement of the indicator effected by the spring 30 is not sudden or quick but is slightly retarded as stated and it comes to rest without vibrating when the lug 42 engages the stop pin 41, and the dog 43 will not be released or tripped by excessive vibration of the indicator shaft and wheel 29 thereon.

If, however, the weight is decreased to any appreciable extent, the tooth of the locking wheel will act upon the upper face of the tooth 51 and so shift the pawl 49 as to bring its lower end into engagement with the pin 53. Further movement of the pawl effected by the toothed wheel will then shift the dog 43 against the tension of its spring to release the latch arm 26, which then returns to normal position with its lug 28 in engagement with the locking wheel (see Fig. 1) and it cannot be again released or tripped until another coin is deposited. If the weight is entirely removed, the weighing spring 19 will turn the gear segment 40 and pinion 31 in directions the reverse of that indicated by the arrows $a$ and $b$ and the pinion, through the medium of the stop pin 41, will return the wheel 29, indicator shaft and indicator to normal position. During this return movement, the beveled cam teeth of the wheel 29 will, by acting on the lug 28, oscillate the latch bar 26 but will not lift it high enough to permit the passage of the dog 43 beneath the pin 46.

It should be noted that the double pointed pawl 49 has two functions. That is to say, it acts as a brake to retard or slightly check the forward movement of the indicator shaft and indicator and when the weight on the scale is reduced, it serves to trip the dog 43 and thereby permit the return of the latch bar to normal locking position. When the latch bar is in locking position, the spring 30 cannot move the indicator forward and, while the latch bar will permit the return of the indicator to its normal zero position, it will prevent any accurate weight-indicating operation during such return movement. It should also be noted that if desired a coin can be deposited to release the latch bar before a weight is placed on the platform. Under such circumstances, the weight-indicating devices will move in forward direction under the controlling action of the brake pawl 49 as the shaft 7, gear segment 40 and pinion 31 are rotated by the weight. By means of the drums 9 and 10 of different diameter, the leverage exerted by the weight-actuated rod upon the weighing spring is increased and this arrangement aids in effecting accurate weighing operations. It should also be noted that by connecting the indicator-operating spring 30 to the indicator shaft 25 and pinion 31, the tension of the spring is the same in any one of the different weight-indicating positions of the shaft and hence the spring will not interfere with the accuracy of the scale. To hold the weighing mechanism in zero position, an arm 54 is secured to the upwardly projecting portion 6 of the frame member 4 and is provided with an inturned upper end through which an adjustable stop screw 55 is threaded. This stop screw is arranged to engage a lug 56 formed upon the drum 10 to thereby hold the weighing mechanism and the pinion 31 operated thereby in normal position. This normal position of the pinion 31 also, by means of its stop pin 41, determines the normal zero position of the indicator shaft 25 and indicator 23 and by adjusting the screw 55, the indicator can be accurately brought to zero position.

Obviously, changes may be made in the details set forth without departure from the essentials of the invention as defined in the claims.

I claim as my invention:

1. In a weighing scale, the combination of weighing mechanism comprising a main shaft, cylindrical drums on said shaft, straps connected to said drums and extending over the peripheries thereof in opposite directions, a weight-actuated rod and weighing spring connected to said straps respectively, a weight indicator normally held against movement, means for releasing said indicator, a gear segment fixed to said main shaft, a pinion meshing with said gear segment and actuated thereby, and a stop device connected to said pinion for limiting the forward movement of said indicator, substantially as described.

2. In a weighing scale, the combination of weighing mechanism comprising a main shaft, cylindrical drums on said shaft, straps connected to said drums and extending over the peripheries thereof in opposite directions, a weight-actuated rod and a weighing spring connected to said straps respectively, a rotatable weight indicator normally held against movement, means for releasing the same, and a pinion concentric with said indicator and meshing with said gear segment, said pinion and indicator having coöperating stop devices for limiting the forward movement of the indicator, substantially as described.

3. In a weighing scale, the combination with a weighing mechanism, of an indicator, a latch normally holding said indicator against movement, means for releasing said latch, a toothed member movable with said indicator in forward direction, a stop controlled by said weighing mechanism for limiting the forward movement of said member and said indicator, a pivoted pawl engaging said toothed member and coöperating therewith to retard the forward movement of said indicator, said pawl being arranged to permit the return movement of said toothed member.

4. In a weighing scale, the combination with a weighing mechanism, of an indicator, a latch normally holding said latch against movement, means for releasing said indicator, means for moving said latch in forward direction, a stop controlled by said weighing mechanism for limiting the forward movement of said indicator and for returning the same to normal position, a toothed member connected to said indicator to move in opposite directions therewith, and a double-pointed brake pawl engaging said toothed member and arranged to permit the movement thereof in opposite directions and to retard the forward movement of said indicator.

5. In a weighing scale, the combination with a weighing mechanism, of an oscillating weight indicator, a toothed wheel fixed thereto, a latch engaging said wheel to hold the same in normal zero position, means for releasing said latch, means for moving said indicator in forward direction when released, a stop controlled by said weighing mechanism to limit the forward movement of said wheel and indicator and return the same to normal position, and a brake pawl engaging said toothed wheel arranged to permit the movement thereof in opposite directions and to retard the forward movement of said indicator.

6. In a weighing scale, the combination of a weighing mechanism, an indicator, a latch normally holding said indicator in zero position, a trip for releasing said latch, a spring connecting said weighing mechanism and said indicator for moving the latter in forward direction, and a stop controlled by said weighing mechanism for limiting the forward movement of said indicator.

7. In a weighing scale, the combination of a weighing mechanism, an indicator, a latch normally holding said indicator in zero position, a trip for releasing said latch, means for moving said indicator in forward direction, a brake device for retarding the forward movement of said indicator, a stop connected to the weighing mechanism to limit the movement thereof and return the same to normal zero position, and a dog for holding said latch in released position arranged to be tripped by the backward movement of said indicator.

8. In a weighing scale, the combination of a weighing mechanism, an indicator movable independently of said weighing mechanism in forward direction, said mechanism having a stop device for limiting the forward movement of said indicator, a latch for said indicator, means for releasing said latch, a dog for holding said latch in released position, and a pawl for retarding the forward movement of said indicator and arranged to be actuated by the backward movement thereof to trip said holding dog.

9. In a weighing scale, the combination of a weighing mechanism, an indicator movable independently of said weighing mechanism in forward direction, said mechanism having a stop device for limiting the forward movement of said indicator, a latch for said indicator, means for releasing said latch, a dog for holding said latch in released position, a toothed member connected to said indicator, and a double-pointed pawl coöperating with said toothed member to retard the forward movement of said indicator and arranged to be actuated by the backward movement of said indicator to trip said holding dog.

10. In a weighing scale, the combination of a weighing mechanism, an indicator movable independently of said weighing mechanism in forward direction, said mechanism having a stop device for limiting the forward movement of said indicator, a latch for said indicator, means for releasing said latch, a dog for holding said latch in released position, a toothed wheel connected to said indicator, and a double-pointed pawl pivoted on said holding dog and engaging said toothed wheel to check the forward movement thereof and arranged to trip said holding dog upon the backward movement of said wheel.

11. In a weighing scale, the combination of a weighing mechanism, an indicator movable independently of said weighing mechanism in forward direction, said mechanism having a stop device for limiting the forward movement of said indicator and for returning the same to normal zero position, a latch for said indicator, means for releasing said latch, a dog for holding said latch in released position, a toothed wheel connected to said indicator to move in opposite directions therewith, and a pawl coöperating with said wheel to check the forward movement of said indicator and trip said holding dog upon the backward movement of said indicator.

12. In a weighing scale, the combination of a weighing mechanism, an indicator movable independently of said weighing mechanism in forward direction, said mechanism having a stop device for limiting the forward movement of said indicator and for returning the same to normal zero position, a toothed wheel fixed to said indicator, a latch normally engaging said toothed wheel, a trip for releasing said latch, a dog for holding said latch in released position, and a double-pointed pawl pivoted on said dog and engaging said toothed wheel, said dog being arranged to retard the forward movement of said indicator and to trip said holding dog upon the backward movement of the indicator.

HARRY W. BARSON.